M. ROSS.
DRILL CHUCK.
APPLICATION FILED JAN. 29, 1917.
1,233,921.
Patented July 17, 1917.
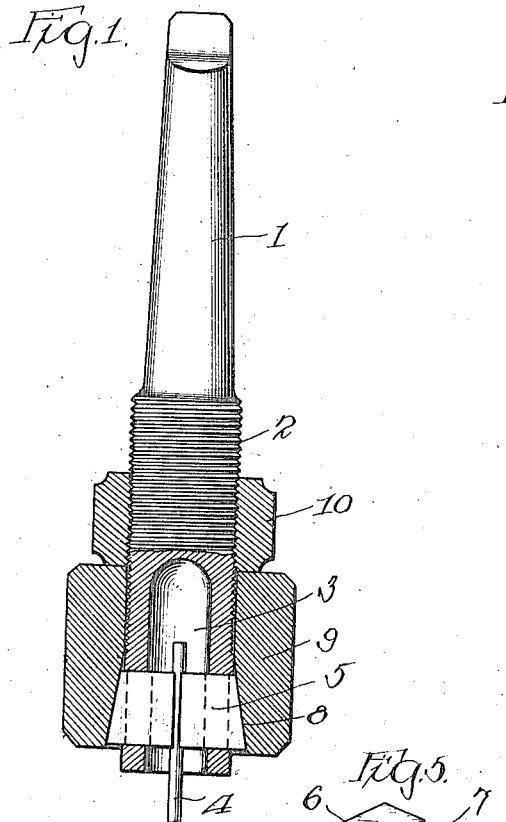
Fig.1.
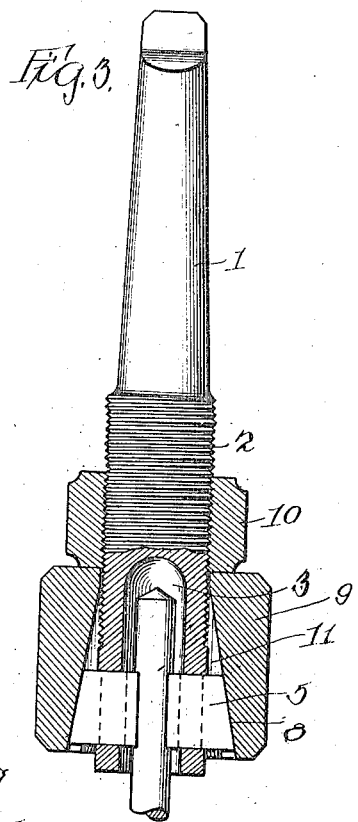
Fig.3.
Fig.5.
Fig.2.
Fig.4.
Fig.7.
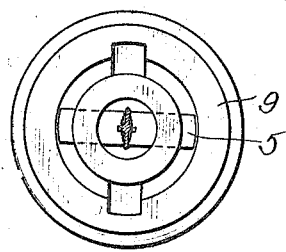
Fig.6.
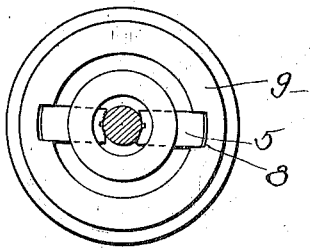
Witness:
Leo. 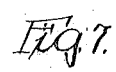
Inventor
Mathew Ross
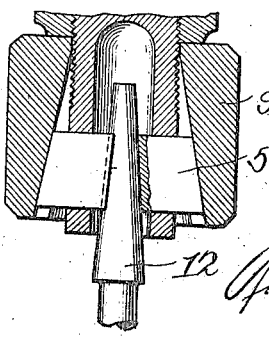
Atty.

UNITED STATES PATENT OFFICE.

MATHEW ROSS, OF CHICAGO, ILLINOIS.

DRILL-CHUCK.

1,233,921.    Specification of Letters Patent.    Patented July 17, 1917.

Application filed January 29, 1917. Serial No. 145,213.

*To all whom it may concern:*

Be it known that I, MATHEW ROSS, citizen of the United States, residing at Chicago, in the county of Cook and State of Illinois, have invented certain new and useful Improvements in Drill-Chucks; and I do hereby declare the following to be a full, clear, and exact description of the invention, such as will enable others skilled in the art to which it appertains to make and use the same.

This invention relates to improvements in drill chucks for drill presses, lathes and the like, and has for its object to provide a device of this character which is adapted to be very quickly and readily adjusted to receive drills of different styles and sizes, and accurately center the same relative to the chuck, and to be easily and quickly clamped to be held rigid therewith.

The invention consists in the features of construction and combinations of parts hereinafter fully described and claimed.

In the accompanying drawings illustrating a suitable embodiment of the invention:

Figure —1— is a central longitudinal section partly in elevation of a drill chuck constructed in accordance with my invention.

Fig. —2— is a bottom plan view of the same.

Fig. —3— is a view similar to Fig. —1— showing the drill-clutching members disposed in position within the chuck to receive the shank of a drill of larger diameter.

Fig. —4— is a bottom plan view showing the clutch elements in the same position as in Fig. —3—.

Fig. —5— is a detail perspective view of one of the clutch elements.

Fig. —6— is a fragmentary detail view similar to Fig. —3— showing clutch elements constructed to engage the tapered shanks of drills.

Fig. —7— is a fragmentary detail sectional view similar to Fig. —3— showing clutch elements constructed to engage drill points having flat ribbed shanks.

It is desirable in drill chucks that each chuck shall be adapted to receive a large variety of drill points of various sizes and preferably also of various styles, without requiring any interchange of parts, and also that the drill points shall be capable of being very quickly and easily removed and replaced and automatically centered and securely held with a minimum amount of labor or time spent in effecting changes.

The drill chuck of the present invention is designed to meet these requirements and comprises a spindle 1 adapted to be received in the chuck of a spindle of the drill press or lathe and be suitably secured therein. The said spindle 1 is slightly tapered, as shown, and terminates in a cylindrical portion 2 externally threaded from its upper end to a point between its ends. The lower end of said portion 2 is axially bored to provide an opening 3 in which the shank 4 of the drill point is adapted to be received. The said shank 4 of the drill point is adapted to be engaged between a pair of clutch members 5 mounted and accurately fitting in transverse slots in the hollow portion of the cylindrical part 2 in which they are reciprocably movable. The inner faces of said clutch members 5 are, as shown in Fig. —5—, slightly V-shaped, and knurled or ribbed, to enable them to obtain a very firm hold upon the smooth cylindrical shanks of drill points, and are further provided with central longitudinal grooves 6 adapted to receive the ribs on the flat shanks of a certain type of drill points used extensively in drilling structural steel, the said flat shanks of which are provided on opposite faces with central longitudinal ribs for centering the same in the drill chucks. The outer faces 7 of the clutch members 5 are inclined to the said drill-point engaging faces, and the axis of the chuck, and are adapted to be engaged by the inner tapered circumferential face 8 at the mouth of the sleeve 9 which is freely longitudinally movable and rotatable upon the lower end portion 2 of the spindle 1. In use the said sleeve 9 rests upon and is supported by the inclined faces of the clutch members 5 and forces them inwardly toward each other and holds them in engagement with the shank 4 of the drill point. A nut 10 has threaded engagement with the part 2 of the spindle 1 and is adapted to bear upon the upper end of the sleeve 9 for forcing the same down upon the inclined faces 7 of the clutch members 5 whereby to force the latter into such engagement with the shank 4 of the drill point as will prevent the latter from rotating relatively to the spindle 1 when in use. As the tapered inner circumferential surface of the sleeve 9 is concentric at all points with the axis of the spindle 1 and the clutch members 5 are of exactly equal dimensions it will be obvious that the latter will be moved equally by the vertical movements of the sleeve 9 and will thus accurately center the drill point with respect to the spindle 1.

In the said beveled or conical inner circumferential wall of the sleeve 9 are two longitudinal grooves 11 of exactly equal depth, and which are diametrically oppositely disposed, and are of a width slightly greater than the thickness of the clutch members 5, are are adapted to receive the outer edge portions of the latter; thus permitting a greater separation thereof than is possible while said clutch members are engaged with the said tapered inner wall of said sleeve. This permits the insertion between the clutch members 5 of a drill point of very much larger diameter, as shown in Fig. —3—, while the said clutch members are positioned contiguous to the mouth of the said tapered wall of the opening in said sleeve; the taper of the latter being confined, as shown in Fig. —1—, to the mouth portion of the central opening in said sleeve, whereas the said grooves extend substantially the entire length of the latter.

In use when it is desired to change drill points the nut 10 is first moved slightly by means of a wrench so as to be freely rotatable on the threads of the part 2 and is then rapidly turned manually so as to enable the sleeve 9 to be readily raised or moved rearwardly from the extreme outer end of the spindle 1. This movement obviously effects a release of the pressure upon the clutch members 5 which are thereupon very easily separated to release the shank of the drill point engaged therebetween which, in fact, will drop out as a general rule upon raising the sleeve 9 to the slightest extent. Thereupon a drill point of either larger or smaller diameter may be inserted in place of the one removed, and the new drill point after being inserted is digitally supported in one hand, while the other either permits the sleeve 9 to move into engagement with said clutch members by gravity, or if horizontally disposed moves it to such position. The drill point may now be released from digital engagement and the nut 10 thereupon rotated until it contacts with the inner or upper end of the sleeve 9. By then applying a wrench to said nut and giving the latter just a short forcible turn, the clutch members 5 will be moved to so forcibly engage the shank of the drill point as to render the latter non-rotatable relatively to the spindle 1. If the drill point is of sufficiently large diameter then the sleeve 9 must be rotated through an arc sufficient to position the grooves 11 to receive the outer end portions of the clutch members 5; thus permitting the separation of such clutch members a distance sufficient to receive the larger diameter shank of the drill point. The operation otherwise is exactly the same.

As shown in Fig. —6— the clutch members 5 may have inner inclined faces adapted to engage the tapered ends of the shanks of drill points 12. The operation of the chuck is exactly the same when used for engagement of tapered shanks as for the cylindrical or flat types respectively.

The construction shown and described may be further modified to adapt the chuck to a greater variety of sizes of drills, as will be obvious. This may be done by increasing the number of sets of grooves 11 of different depths so that in all instances the clutch members will be positioned contiguous to the mouth of the tapered opening of the sleeve 9 instead of being disposed to project therefrom or so far inwardly of the mouth of the chuck as to be less readily engageable from the exterior of the device.

I have found the clutch members 5 to be so easily capable of manipulation to separate the same to receive the shanks of drill points as to obviate the necessity of employing springs or other means to effect a forceful separation thereof, though obviously such springs may be employed without departing from the invention as defined in the appended claims.

I claim as my invention:—

1. A drill-chuck comprising a spindle provided at one end with an axial opening and a plurality of radially disposed longitudinal slots arranged inwardly of the end thereof, coacting clutch-members snugly fitting and reciprocably movable in said slots radially with respect to said spindle, said clutch members being of equal dimensions and each thereof provided with an outer inclined face, a sleeve slidably and rotatably mounted on said spindle and provided with a tapered mouth presenting an inner circumferential face of the same incline relative to the spindle-axis as the outer edges of said clutch-members, said sleeve normally supported upon the outer ends of said clutch members and being of sufficient weight to move the same into sufficiently forcible engagement with a drill point to support the same, and means on said spindle for forcing said sleeve in said direction to force said clutch-members into firm engagement with a drill point to hold the latter against rotation relatively thereto.

2. A drill-chuck comprising a spindle provided at one end with an axial opening and a plurality of radially disposed longitudinal slots arranged inwardly of the end thereof provided with said opening, coacting clutch-members snugly fitting and reciprocably movable in said slots radially with respect to said spindle, said clutch members being of equal dimensions and each thereof provided with an outer inclined face, a sleeve slidably and rotatably mounted on said spindle and provided with a tapered mouth presenting an inner circumferential face of the same incline relative to the spindle-axis as the outer edges of said clutch-members, said sleeve arranged to automatically normally engage said clutch members and bear upon the outer ends thereof with sufficient force to hold a drill point firmly in position in said spindle, and means on said spindle for forcing said sleeve in said direction to force said clutch-members into firm engagement with a drill point to hold the latter against rotation relatively thereto.

3. A drill-chuck comprising a spindle provided at one end with an axial opening and a plurality of radially disposed longitudinal slots arranged inwardly of the end thereof, coacting clutch members snugly fitting and reciprocably movable in said slots radially with respect to said spindle, said clutch members being of equal dimensions and each thereof provided with an outer inclined face, a sleeve manually slidable and rotatable on said spindle and normally automatically engaging the outer ends of said clutch members with sufficient force to hold a drill point firmly in position in said spindle, and means on said spindle for forcing said sleeve in said direction to force said clutch-members into firm engagement with a drill point to hold the latter against rotation relatively thereto.

4. A drill-chuck comprising a spindle provided at one end with an axial opening and a plurality of radially disposed longitudinal slots arranged inwardly of the end thereof, coacting clutch-members snugly fitting and reciprocably movable in said slots radially with respect to said spindle, said clutch members being of equal dimensions and each thereof provided with an outer inclined face, a sleeve manually slidable and rotatable on said spindle and normally automatically engaging the outer ends of said clutch members with sufficient force to hold a drill point firmly in position in said spindle, and a nut having threaded engagement with said spindle and adapted to engage said sleeve to force the latter in a direction to force said clutch-members radially inwardly.

5. A drill chuck, comprising a spindle having an axial opening and equipped with drill-point engaging elements, a sleeve manually slidable on said spindle and normally automatically engaging said elements for holding the same firmly engaged with a drill point, and means on said spindle for forcing said sleeve in said direction to force said clutch-members into firm engagement with a drill point to hold the latter against rotation relatively thereto.

6. A drill-chuck comprising a spindle provided at one end with an axial opening and a plurality of radially disposed longitudinal slots arranged inwardly of the end thereof provided with said opening, coacting clutch-members snugly fitting and reciprocably movable in said slots radially with respect to said spindle, said clutch members being of equal dimensions and each thereof provided with an outer inclined face, a sleeve slidably and rotatably mounted on said spindle and provided with a tapered mouth presenting an inner circumferential face of the same incline relative to the spindle-axis as the outer edges of said clutch-members, and adapted to engage the same to force said clutch-members radially inwardly to engage a drill-point, there being longitudinal grooves in the tapered inner wall of said sleeve corresponding in number and relative location with said clutch members and adapted to receive the latter for increasing their limit of separation to permit the engagement thereby of drill points of relatively large diameter, and means on said spindle for forcing said sleeve in a direction to force said clutch-members into firm engagement with a drill point to hold the latter against rotation relatively thereto.

7. A drill-chuck comprising a spindle provided at one end with an axial opening and a plurality of radially disposed longitudinal slots arranged inwardly of the end thereof provided with said opening, coacting clutch-members snugly fitting and reciprocably movable in said slots radially with respect to said spindle, said clutch members being of equal dimensions and each thereof provided with an outer inclined face, a sleeve slidably and rotatably mounted on said spindle and provided with a tapered mouth presenting an inner circumferential face of the same incline relative to the spindle-axis as the outer edges of said clutch-members, and adapted to engage the same to force said clutch-members radially inwardly to engage a drill-point, there being longitudinal grooves in the tapered inner wall of said sleeve corresponding in number and relative location with said clutch members and adapted to receive the latter for increasing their limit of separation to permit the engagement thereby of drill points of relatively large diameter, and a nut having threaded engagement with said spindle and adapted to engage said sleeve to force the latter in a direction to force said clutch-members radially inwardly.

In testimony whereof I have signed my name in presence of two subscribing witnesses.

MATHEW ROSS.

Witnesses:
M. M. BOYLE,
FRED SPRINKMANN.